US012675353B2

(12) United States Patent
McHie et al.

(10) Patent No.: US 12,675,353 B2
(45) Date of Patent: Jul. 7, 2026

(54) SYSTEMS AND METHODS FOR REPORTING DIAGNOSTIC INFORMATION IN A DATA READING SYSTEM

(71) Applicant: Datalogic IP Tech S.r.l., Lippo di Calderara di Reno (IT)

(72) Inventors: Quinn William McHie, Eugene, OR (US); Emmett Burke Hale, Eugene, OR (US)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 24 days.

(21) Appl. No.: 18/513,123

(22) Filed: Nov. 17, 2023

(65) Prior Publication Data

US 2025/0165323 A1     May 22, 2025

(51) Int. Cl.
*G06F 11/07* (2006.01)
*G06Q 20/20* (2012.01)

(52) U.S. Cl.
CPC ...... *G06F 11/0733* (2013.01); *G06F 11/0769* (2013.01); *G06F 11/079* (2013.01); *G06F 11/0793* (2013.01); *G06Q 20/20* (2013.01)

(58) Field of Classification Search
CPC ............. G06F 11/0733; G06F 11/0769; G06F 11/079; G06F 11/0793; G06Q 20/20
See application file for complete search history.

(56) References Cited

U.S. PATENT DOCUMENTS

| | | | | |
|---|---|---|---|---|
| 8,332,323 | B2 * | 12/2012 | Stals | ...................... G06Q 20/40 |
| | | | | 705/40 |
| 8,380,177 | B2 * | 2/2013 | Laracey | ............. G06Q 30/0253 |
| | | | | 455/414.1 |
| 8,430,318 | B2 | 4/2013 | McQueen et al. | |
| 9,004,359 | B2 | 4/2015 | Shearin et al. | |
| 9,305,198 | B2 | 4/2016 | Thompson et al. | |
| 10,019,305 | B2 * | 7/2018 | Aneja | ................. G06F 11/0709 |
| 10,049,247 | B2 | 8/2018 | Gao | |
| 10,248,896 | B2 | 4/2019 | Gao et al. | |
| 10,860,413 | B2 * | 12/2020 | Marquez | ............. G06F 11/0793 |
| 11,461,754 | B2 * | 10/2022 | Crooks | .............. G06Q 20/3274 |
| 2006/0167844 | A1 * | 7/2006 | Srinivas | ................. G06Q 10/06 |
| 2020/0125812 | A1 | 4/2020 | Canini et al. | |
| 2023/0206205 | A1 | 6/2023 | Howard et al. | |

FOREIGN PATENT DOCUMENTS

WO     WO-2022060410 A1 *   3/2022   .......... G06F 11/0733

* cited by examiner

*Primary Examiner* — Joseph R Kudirka
(74) *Attorney, Agent, or Firm* — Stoel Rives LLP

(57) ABSTRACT

The disclosure relates to a data reading system operable for obtaining and decoding data from items processed by a customer in a retail transaction, where the data reading system is further operable to identify an occurrence of a performance anomaly impacting operation of the data reading system and to communicate the performance anomaly to a user together with instructions for resolving the anomaly. The communication is presented to the user via a display and may include any of a video, audio, or text format to clearly communicate the details of the issue and the instructions for resolution.

20 Claims, 3 Drawing Sheets

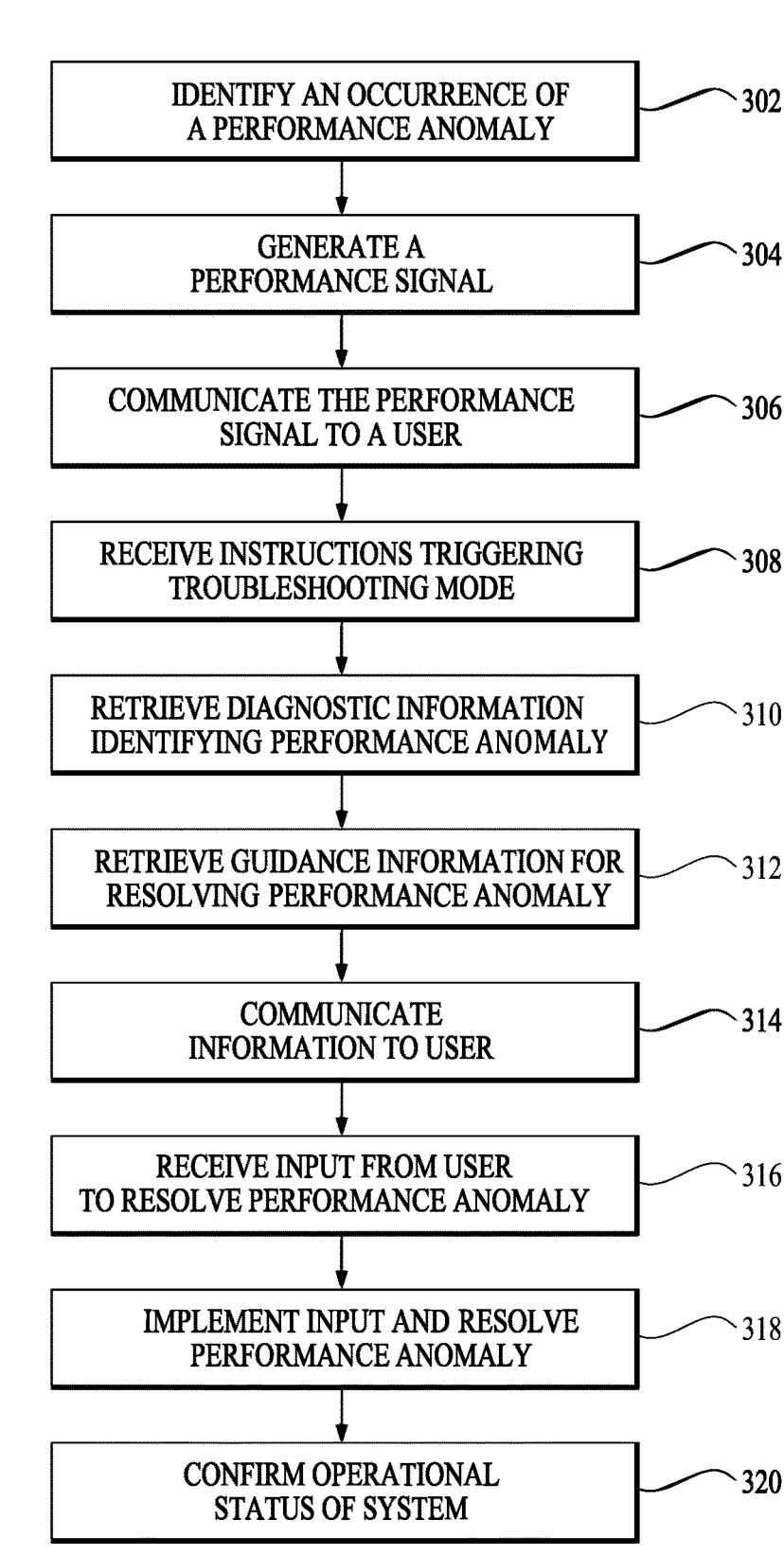

300

IDENTIFY AN OCCURRENCE OF
A PERFORMANCE ANOMALY — 302

GENERATE A
PERFORMANCE SIGNAL — 304

COMMUNICATE THE PERFORMANCE
SIGNAL TO A USER — 306

RECEIVE INSTRUCTIONS TRIGGERING
TROUBLESHOOTING MODE — 308

RETRIEVE DIAGNOSTIC INFORMATION
IDENTIFYING PERFORMANCE ANOMALY — 310

RETRIEVE GUIDANCE INFORMATION FOR
RESOLVING PERFORMANCE ANOMALY — 312

COMMUNICATE
INFORMATION TO USER — 314

RECEIVE INPUT FROM USER
TO RESOLVE PERFORMANCE ANOMALY — 316

IMPLEMENT INPUT AND RESOLVE
PERFORMANCE ANOMALY — 318

CONFIRM OPERATIONAL
STATUS OF SYSTEM — 320

FIG. 3

SYSTEMS AND METHODS FOR REPORTING DIAGNOSTIC INFORMATION IN A DATA READING SYSTEM

BACKGROUND

The present disclosure relates generally to data reading systems in a retail setting, and more particularly, to such systems designed to convey diagnostic information impacting performance or other functions of the data reading system, where the diagnostic information is delivered in a streamlined and readily accessible manner for efficiently resolving performance anomalies.

Data reading systems in general are used in a variety of settings for reading optical codes, acquiring data, and/or capturing images of items. In a retail environment, data reading devices are well known for reading UPC and other types of optical codes (e.g., barcodes) on grocery items or packages to identify the item and add the item to the customer's transaction list for purchasing during a checkout process. In a conventional self-checkout system, the customer can scan, weigh, and pay for items without the need for assistance by a store clerk or any other personnel.

In some instances, data reading systems may experience errors, performance anomalies, or other disruptions that may impact their normal operation. For example, some anomalies that a data reading system may experience include: an inability to properly capture images of the items during a transaction, an inability to decode optical codes for identifying items during a transaction, an inability to communicate with an inventory database for processing items, component failures, any various other potential anomalies. In a conventional data reading system, this type of diagnostic information identifying errors and performance anomalies may be communicated via a simple output display, such as a conventional 7-segment display. Typically, these types of simple displays communicate anomalies using a simple alphanumeric code to indicate an error code, a status, or other suitable information for the data reading system that may require attention. Since the output display usually presents limited information, a user may not understand the source of the issue or how to resolve it simply from viewing the alphanumeric code or other limited information provided by the display. Rather, the user would typically consult a look-up table or other suitable manual for deciphering the alphanumeric code to understand the full nature of the issue and, in some cases, obtain information for resolving the performance anomaly.

Accordingly, the inventors have identified a need for an improved data reading system designed to facilitate communication of diagnostic information related to performance anomalies, such as operational errors, operational status, and other suitable information, in a clear manner for efficient handling. The inventors have also identified a need for such an improved system capable of providing easily digestible information for resolving the identified performance anomaly. Additional aspects and advantages of such systems will be apparent from the following detailed description of example embodiments, which proceed with reference to the accompanying drawings.

Understanding that the drawings depict only certain embodiments and are not, therefore, to be considered limiting in nature, these embodiments will be described and explained with additional specificity and detail with reference to the drawings.

BRIEF DESCRIPTION OF THE DRAWINGS

FIG. 3 is a flow chart illustrating a streamlined process for communicating diagnostic information to a user to aid in resolving performance anomalies of a data reading system in accordance with one embodiment.

DETAILED DESCRIPTION OF DISCLOSED EMBODIMENTS

Figure 1:
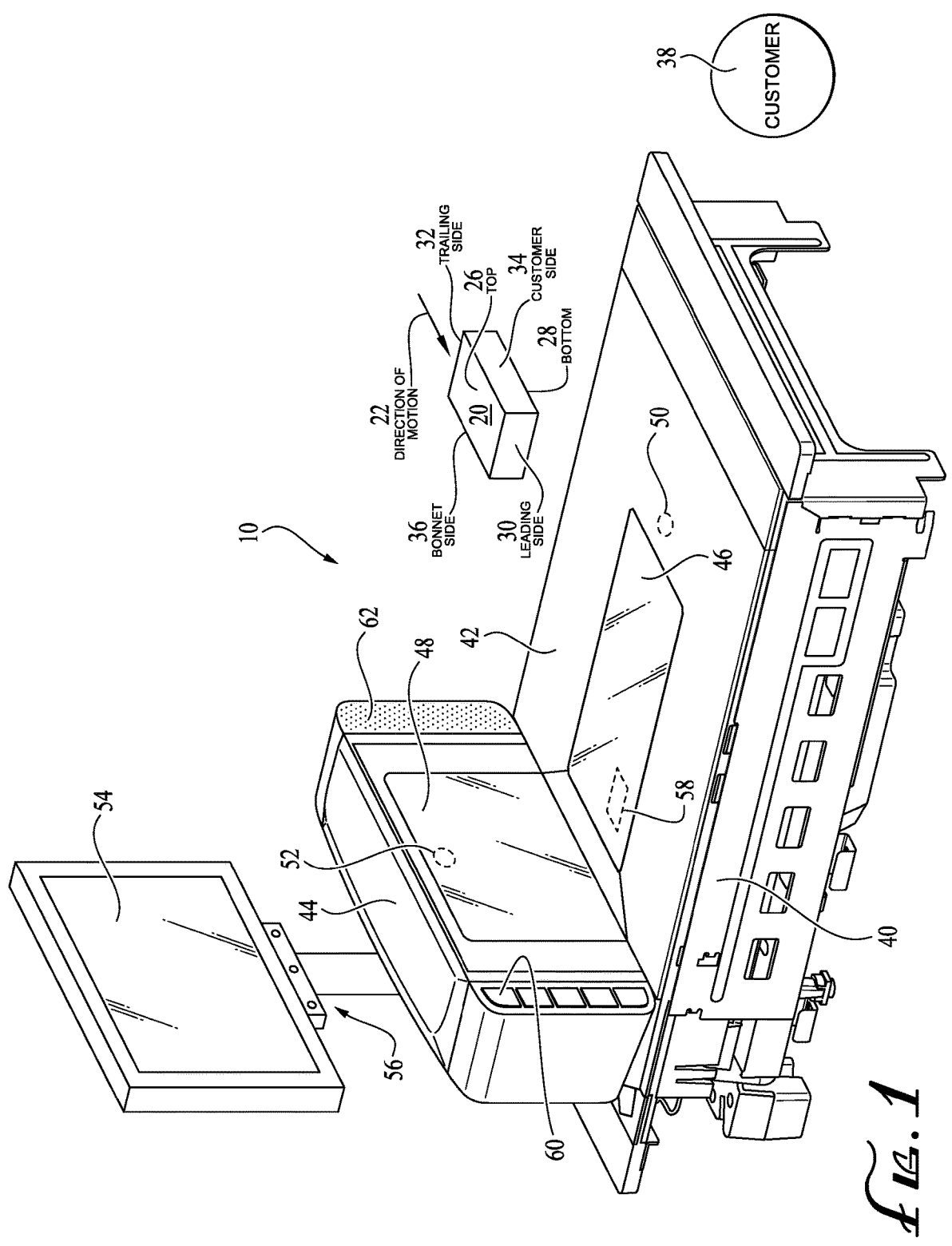
FIG. 1 illustrates a data reading system operable for scanning items and processing a purchase transaction in accordance with one embodiment.

With reference to the drawings, this section describes specific embodiments relating to a data reading system and its detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

With collective reference to the figures, the following disclosure relates to a data reading system, such as a self-checkout system or other suitable point-of-sale system, used in a retail setting to complete a customer transaction for the purchase of various goods offered in a retail facility. The data reading system may include any suitable components for capturing data from an item and any suitable reading engine configuration for decoding the captured data to complete the retail transaction.

As further described in detail below, the data reading system is designed to improve communication of diagnostic information relating to a performance anomaly (such as an error status, operational status, device or component health, etc.) of the data reading system to a user to clearly identify one or more anomalies that require attention and provide information to the user for expedient troubleshooting and resolution of the performance anomaly. As briefly mentioned previously, one current disadvantage of conventional data reading systems is that the output display designed to communicate performance characteristics of conventional data reading systems provides limited information in the form of a simple alphanumeric code that itself communicates little to the user. The alphanumeric code is primarily meant to direct the user to consult a lookup table, a manual, or other secondary resource to personally identify the issue for handling. The embodiments described herein with reference to the figures describe an improved data reading system designed to provide the user with more detailed information related to the identified issue and/or more directly actionable information, such as videos, images, text, website links, and/or other suitable information to clearly communicate the diagnostic information and provide resources for quick resolution. In some embodiments, such as for data reading systems that already include audiovisual technology (e.g., electronic displays, speakers, etc.) for processing transactions, the improvements described herein can be incorporated by through integration with the existing audiovisual technology.

In some embodiments, the improved data reading system may also provide an alphanumeric code in a conventional output display as a secondary measure, but the data reading system is designed to minimize or entirely avoid the need for a user to consult look-up tables or other secondary materials to decipher performance anomalies. Instead, the data reading system streamlines the troubleshooting experience to facilitate repairs and minimize system down time. Additional details of these and other embodiments of the data reading system and related methods are further discussed below with reference to the accompanying figures.

"Image data" as used herein may include raw images as well as processed images (e.g., cropped, compressed, etc.) from the raw images as well as other forms of data derived from raw image data that provides useful information for image analysis, such as descriptor data, histogram data, etc. Image data may include both individual image frames as well as multiple frames (e.g., streaming video). In some embodiments, raw images may include information arranged in two dimensions which are the x (width) and y (height) coordinates of a 2D sensor. The information at each x, y coordinate may include monochrome data, RGB data, depth data, multi-spectral data, infrared data, etc. as well as combinations thereof (e.g., RGB-depth may be captured by 3D cameras). Image data may be captured by one or more imagers arranged at various positions within the housing of the fixed retail scanner, such as in a horizontal base unit or a vertical bonnet of a bi-optic scanner having imagers positioned in two different planes. Single plane scanners (e.g., horizontal or vertical only housings) are also contemplated and are within the scope of the disclosure. Image data may also be captured by one or more imagers positioned external to the primary scanning unit, such as peripheral devices (e.g., top-down reader imagers, security imagers, bottom of basket readers, etc.) that may also provide image data to the fixed retail scanner and/or remote systems. In some cases, image data and images may be used interchangeably herein.

FIG. 1 illustrates an example embodiment of a data reading system 10 in accordance with one embodiment. The following section briefly describes general components of the data reading system 10 and provides an example operation of the data reading system 10 when used in a retail establishment to process a transaction. With reference to FIG. 1, the data reading system 10 is used to scan, weigh (as needed), and pay for items 20 as part of a customer transaction. In some embodiments, the data reading system 10 may be designed as a self-checkout system for processing transactions without the need for assistance by store clerk or other personnel. In other embodiments, the data reading system 10 may instead be incorporated into a checkout counter operated by a clerk. For discussion purposes, it should be understood that while the drawings and relevant discussion may reference the data reading system 10 as a self-checkout system, embodiments of the disclosure also include systems that may be operated by a store clerk in an assisted checkout lane environment. Thus, it should be understood that references to "customer" are also applicable to a "clerk" or "operator" who may be the user of the data reading system 100 in certain situations. In addition, the scope of the disclosure incorporates other configurations for data reading systems, including those that may include hand-held data reading systems.

As illustrated in FIG. 1, the data reading system 10 is operable to obtain information (e.g., optical codes, images, etc.) from an example six-sided item 20 (e.g., a grocery item) that is passed along a direction of motion 22 through a read region of the data reading system 10. For general purposes of discussion, the item 20 is represented in the figures as a six-sided, box-shaped package having a top surface 26, a bottom surface 28, a leading side 30, a trailing side 32, a customer side 34, and a bonnet side 36. While the item 20 is illustrated and described as a box-shaped package for convenience, it should be understood that the item 20 may encompass other shapes, including, for example, round fruits or vegetables, cylindrical cans, irregularly shaped packages, such as a bag of potatoes, potato chips, or the like.

The data reading system 10 may be a two-plane or bioptic reader having a housing that includes a lower base section 40 supporting a platter 42, and a bonnet or raised upper section 44 extending from and protruding upwardly from the platter 42 (and the lower base section 40). The data reading system 10 includes one or more data readers 50 housed within lower base section 40 underneath the platter 42, and the bonnet 44 may further include one or more data readers 52 housed therein. The data readers 50, 52 are arranged within the platter 42 and bonnet 44, respectively, to project their fields-of-view through the respective windows 46, 48 to capture and decode an optical code on the item 20 as it moves through the combined read region of the data reading system 10. In some embodiments, the data reading system 10 may incorporate any suitable optical components (not shown in FIG. 1) within the lower base section 40 and bonnet 44 to ensure the respective fields-of-view of the data readers 50, 52 are oriented as needed to capture data from the item 20. In other embodiments, the data reading system may be a single plane reader without a bonnet or may have other suitable configurations.

The data reading system 10 further includes a status display 58 that may be disposed within the lower base section 40, where the information on the status display 58 is viewable through the scan window 46. In other embodiments, the status display 58 may be positioned within the bonnet 44 and viewable through window 48. In still other embodiments, the status display 58 may be located in another suitable position. The status display 58 may take any form, such as an electronic seven-segment display or other suitable displays, where the status display 58 is operable to convey information to a user relating to a performance characteristic of the data reading system 10. In some embodiments, the status display 58 may present one or more alphanumeric characters, symbols, or other suitable data designed to communicate a code from which the user can obtain diagnostic information relating to the data reading system 10 for troubleshooting purposes as needed. For example, the status display 58 may present suitable codes for communicating errors, performance anomalies, operational status, and other suitable information relating to the data reading system 10. Typically, the codes consist of a series of numbers and/or letters that provide little or no actionable information, but are meant to be deciphered, such as by consulting a look-up table or other suitable source, to understand the specific issue that requires attention for the data reading system 10.

For purposes of this disclosure, reference to a "data reader" is used in an expansive sense to describe any suitable device (or combination of devices) capable of obtaining and decoding coded information from an item 20. In some embodiments, a data reader may include a camera or other suitable imaging system, a processor, a decoding unit, and a controller for communicating data to other data readers or external systems for processing. In other embodiments, the data reader may include a subset of these components within a common housing and other components may be external to the data reader itself. For example, in one embodiment, the data readers may each include an imager designed to obtain images of the item 20 and to communicate those images to the decoding unit (which may be part of the processor) in an external database for decoding the coded information captured in the images and identify the item 20.

The data readers 50, 52 may include any suitable decoding algorithms to decode coded information from the item 20 that may be contained within one-dimensional codes, two-dimensional codes, stacked codes, or other code configurations. In this disclosure, the data readers 50, 52 may be referenced as including imagers or imaging systems, but it should be understood that the reference is meant to provide an example configuration for the data readers. Other data reading systems and data reader configurations may be used without departing from the principles of the disclosed subject matter. Examples of various configurations include those described in any of the following: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued Apr. 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READER," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGES OF AND DECODE INFORMATION FROM MACHINE-READABLE SYMBOLS," and U.S. patent application Ser. No. 18/071,594, filed Nov. 29, 2022, and entitled "FIXED RETAIL SCANNER WITH MULTI-PORT NETWORK SWITCH AND RELATED METHODS, the disclosure of each of which is incorporated by reference herein in its entirety.

With reference to FIG. 1, the following provides an example operation of the data reading system 10 in accordance with one embodiment. During a transaction, the item 20 is moved along the direction of motion 22 across the platter 42 above the horizontal scan window 46 and in front of the vertical scan window 48. As the item 20 is moved across the scan windows 46, 48, the data readers 50, 52 cooperate to obtain image data for all sides of the item 20 to find and decode the optical code. For example, if the optical code (or other target data) is present on the bonnet side surface 36 of the item 20, the data reader 52 reading through the vertical window 48 of the bonnet 44 will capture the optical code in an image of the side surface 36 for decoding. Similarly, if the optical code is on the bottom surface 28 of the item 20, then the data reader 50 reading through the horizontal window 46 may capture the optical code in an image for decoding. Likewise, if the optical code is on any of the remaining surfaces of the item 20, one or both data readers 50, 52 (either individually or in combination) may capture image views bearing the optical code on the item 20 for decoding. If the optical code is positively captured and decoded, the data reading system 10 may emit a beeping (or other) sound indicating that the optical code was properly read, indicating to the customer 38 that the next item 20 may be processed. Alternatively, the data reading system 10 may emit a different beeping (or other) sound indicating that the optical code was not properly read and may also emit a message requesting that the customer 38 reprocess the item 20. Other feedback methods may also be provided, such as visual feedback (e.g., via an LED or an electronic display), indicating a successful read or an unsuccessful read.

As illustrated in FIG. 1, the data reading system 10 may include a display 54 operable to display information, such as a running transaction list of the items 20 purchased, images, selectable icons, text, or other suitable information to facilitate the transaction. The display 54 is separate from the status display 58 and may be disposed external to the housing (e.g., the lower base section 40 and the bonnet 44) of the data reading system 10. The data reading system 10 may further include a camera 56 operable for obtaining images of the customer 38 and the items 20 to aid in the transaction as needed. In some embodiments, the display 54 may show an image of a purchased item captured by the camera 56, (and/or captured by data readers 50, 52 or other cameras internal to the data reader housing), a list of purchase items and running costs, options for identifying items by name or image, item weight, or other suitable transaction information associated with the items 20. In some embodiments, the display 54 may be a touch screen that allows the customer 38 to interact directly with the screen (or via a stylus or other suitable instrument) to enter information and respond to prompts to allow the customer 38 to manage the transaction. The touch screen may be any of several suitable display types, such as an integrated liquid crystal (LCD) display, an organic light-emitting diode (OLED) display, or other display with suitable touch screen capabilities for detecting the customer's touch via a finger, stylus, or other suitable input device.

Figure 2:
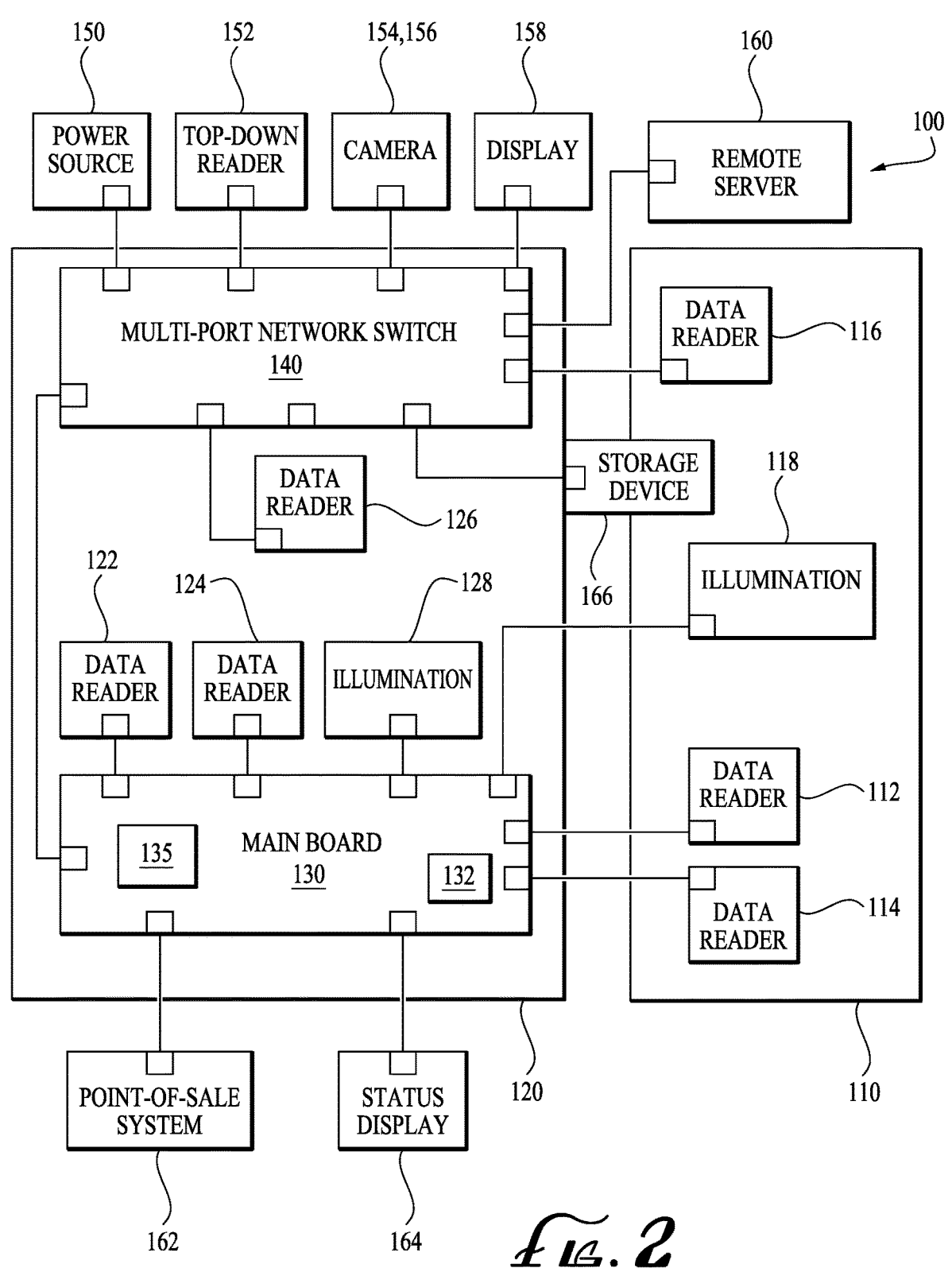
FIG. 2 is a simplified block diagram illustrating components of a data reading system in accordance with one embodiment.

FIG. 2 is a simplified block diagram of a data reading system 100 according to an embodiment of the disclosure. As illustrated in FIG. 2, the data reading system 100 may be operably coupled with one or more of a power source 150, a top-down reader (TDR) 152, peripheral cameras 154, 156, a display 158, a remote server 160, and/or a point of sale (POS) system 162. Additional details of the data reading system 100 are described below.

With reference to FIG. 2, the data reading system 100 may be a bi-optic fixed retail scanner having a vertical housing 110 and a horizontal housing 120 (in a similar fashion as the data reader 10 of FIG. 1) in some embodiments. The data reading system 100 may be installed in a retail environment (e.g., grocery store), which typically is disposed within a counter or other support structure of an assisted checkout lane or a self-checkout lane. The vertical housing 110 provides an enclosure for one or more data readers 112, 114, 116, active illumination assemblies 118 (e.g., LED assemblies), and other optical elements (e.g., lenses, mirrors, etc.) and electrical elements (e.g., cables, circuit boards, etc.) therein. Similarly, the horizontal housing 120 provides an enclosure for one or more data readers 122, 124, 126, active illumination elements 128 (e.g., LED assemblies), and other optical elements (e.g., lenses, mirrors, etc.) and electrical elements (e.g., cables, circuit boards, etc.) therein. In some embodiments, the vertical housing 110 and the horizontal housing 120 may be generally orthogonal to each other (including slightly angled orientations, such as being in the range of ±100 from orthogonal). Depending on the arrangement and orientation of the different opto-electrical elements, certain elements related to providing a horizontal field of view may be physically located within the vertical structure and vice versa.

In one embodiment, the data reading system 100 may include one or more different types of data readers, such as monochrome imagers and/or color imagers. For example, data readers 112, 114 in vertical housing 110 may be monochrome imagers configured to capture monochrome images through the vertical window of the data reading system 100. Likewise, data readers 122, 124 in horizontal housing 120 may be monochrome imagers configured to capture monochrome images through the horizontal window of the data reading system 100. Data reader 116 in vertical housing 110 may be a color camera module configured to capture color images through the vertical window of the data reading system 100. Likewise, data reader 126 in horizontal housing 120 may be a color camera module configured to capture color images through the horizontal window of the data reading system 100. In such embodiments, monochrome images may be analyzed (e.g., by a decoder) to decode one or more indicia (e.g., 1D barcodes, 2D barcodes, optical character recognition, digital watermarks, etc.), and color images may be analyzed (e.g., by an image processor) where color information may be particularly advantageous, such as produce recognition, item recognition or verification, and security analysis. Such analysis may be performed by local and/or remote processors that may contain an artificial intelligence (AI) engine or otherwise configured to perform other machine learning techniques.

The data reading system 100 may further include a main board 130 and a multi-port network switch 140. As shown herein, the main board 130 and the multi-port network switch 140 may be disposed within the horizontal housing 120 in one embodiment. Bi-optic readers tend to have a larger horizontal housing (as compared to the vertical housing), which provides support for the device within a cavity in a counter and provides space to support a scale (not shown) used to weigh produce or other items sold by weight or otherwise perform weighing of items when placed on the horizontal surface (often called a "weigh platter"). It is contemplated that other embodiments may instead include the main board 130 and/or the multi-port network switch 140 within the vertical housing 110. In an embodiment where one of the multi-port network switch 140 or the main board 130 is disposed within the vertical housing 110 and the other is disposed within the horizontal housing 120, the two boards may be generally oriented orthogonal to each other similar to the orientation of the windows or another angled relationship (e.g., slightly angled orientations such as being in the range of ±10° from orthogonal). The ports may be at least somewhat aligned in the orthogonal direction or other arrangement to accommodate easy connection of network cables therebetween.

The main board 130 may be operably coupled with the data readers 112, 114 and the data readers 122, 124, such as via a communication interface (e.g., a MIPI interface) or other suitable interface. The main board 130 may have decoding software embedded therein and/or stored within internal memory 132 such that one or more on-board processors 135 may receive monochrome images to perform decoding on the optical indicia and provide the decoding result to a point of sale (POS) system 162 operably coupled thereto to complete a transaction. The one or more on-board processors 135 may also be configured to provide control (e.g., coordination or synchronization) of the various components of the system including camera exposure and timing of active illumination assemblies 118, 128 of the system. In addition, the one or more on-board processors 135 may also manage operation of a status display 164 and include suitable software stored within internal memory 132 (or other suitable location) for conveying codes through the status display 164 to a user to communicate diagnostic information related to the data reading system 100. In some embodiments, the status display 164 may be coupled directly to the main board 130 as shown in FIG. 2, whereas in other embodiments, the status display 164 may be coupled indirectly to the main board 130, such as via the multi-port network switch 140.

Although a single block is shown representing one or more on-board processors 135, it is contemplated that some embodiments may include multiple processing components (e.g., microprocessors, microcontrollers, FPGAs, AI accelerator modules, etc.) configured with suitable instructions and programming to perform different tasks, alone or in combination, including object detection, system control, diagnostic and performance monitoring, barcode decoding, optical character recognition, artificial intelligence, machine learning analysis, or other similar processing techniques for analyzing the images for product identification or verification or other desired events.

In one embodiment, the multi-port network switch 140 may be operably coupled to data reader 116, data reader 126, and with main board 130 located within the data reading system 100. Multi-port network switch 140 may also be operably coupled to the power source 150 as well as peripheral devices such as the TDR 152, peripheral cameras 154, 156, display 158, the remote server 160, and/or a removable storage device 166. The number and types of peripheral devices may depend on a desired application within a retail environment. The TDR 152 may be configured as a stand connected to the data reading system 100 that typically provides a generally close overhead (angled) view of the read-zone to provide a top view of a product whereas internal data readers 112, 114, 116, 122, 124, 126 may be better suited for capturing images of the bottom and/or sides of the object within the read-zone. In some embodiments, peripheral cameras 154, 156 may be located remotely from the data reading system 100 such as being mounted on a ceiling or wall of the retail environment to provide additional views of the read-zone or checkout area. Such views may be useful for security analysis of the checkout area such as product verification, object flow, and human movements with the retail establishment. Such analysis may be performed by a remote service or other local devices (e.g., located on or otherwise coupled to the main board 130 or ethernet switch 140). Other peripheral devices may be located near the data reading system 100, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 162 may be coupled directly to the main board 130. Such a connection may be via communication interfaces such as USB, RS-232, or other such interfaces. In some embodiments, the POS 162 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135. The multi-port network switch

140 may include a plurality of ports to provide advanced network connectivity (e.g., Ethernet) between internal devices (e.g., CCMs 116, 126) within the data reading system 100 and external devices (e.g., TDR 152, peripheral camera(s) 154, 156, display 158, remote server 160, etc.) disposed outside the vertical and horizontal housings 110, 120 of the data reading system 100. Thus, the multi-port network switch 140 may provide an Ethernet backbone for the elements within the data reading system 100 as well as for external devices coupled to the data reading system 100 for control and/or managing data flow or analysis. As an example, multi-port network switch 140 may be implemented with a KSZ9567 Ethernet switch or other EtherSynch® product family member available from Microchip Technology Inc of Chandler, Arizona or other similar products or devices configured to provide network synchronization and communication with network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reading system 100.

Although FIG. 2 shows one block for active illumination assemblies 118, 128 in each of the vertical and horizontal housings 110, 120, some embodiments may include multiple such assemblies in each of the horizontal and vertical housings 110, 120 to provide for different lighting options at different angles across the read-zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130 such as a control panel or other such device. In yet other embodiments, the illumination assemblies 118, 128 may be coupled to the multi-port network switch 140 which may route triggering controls from the main board 130. TDR 152, one or more of the peripheral cameras 154, 156, and the display 158 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the data readers 112, 114, 116, 122, 124, 126. Monochrome images may be captured by monochrome data readers 112, 114, 122, 124 and color images may be captured by color data readers 116, 126. The multi-port network switch 140 may be configured to coordinate (e.g., synchronize) timing of camera exposure and active illumination (e.g., white illumination) with the color data readers 116, 126 (as controlled by the controller on the main board 130) to occur in an offset manner with the timing of the camera exposure and active illumination (e.g., red illumination) with the monochrome data readers 112, 114, 122, 124.

Image data (e.g., streaming video, image frames, etc.) from the color data readers 116, 126 may be routed through the multi-port network switch 140 to the processing/analysis modules located internal to the data reading system 100 such as the one or more processors 135 supported by the main board 130. As such, image analysis (e.g., AI, machine learning, OCR, object recognition, item validation, produce recognition, analytics, etc.) may be performed on the color images internally within the data reading system 100 by the one or more processors 135 supported by the main board 130. In some embodiments, barcode decoding may also be performed on the color images internally within the data reading system 100 by the one or more processors 135 supported by the main board 130. Image data from the color data readers 116, 126 may also be routed through the multi-port network switch 140 to external devices, such as remote server 160 or other similar devices including any network enabled POS systems. As such, image analysis (e.g., AI, machine learning, OCR, object recognition, item validation, produce recognition, analytics, etc.) may be performed on the color images externally to the data reading system 100 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch enables image data to be provided to internal as well as external processing resources.

Image data from the monochrome data readers 112, 114, 122, 124 may be provided to the main board 130 to the processing/analysis modules located internal to the data reading system 100 such as the one or more processors 135 supported by the main board 130. As such, barcode decoding may also be performed on the color images internally within the data reading system 100 by the one or more processors 135 supported by the main board 130. In some embodiments, image analysis (e.g., AI, machine learning, OCR, object recognition, item validation, produce recognition, analytics, etc.) may be performed on the monochrome images internally within the data reading system 100 by the one or more processors 135 supported by the main board 130. Image data from the monochrome data readers 112, 114, 122, 124 may also be routed through the multi-port network switch 140 to external devices, such as remote server 160 or other similar devices including any network enabled POS systems. As such, image analysis (e.g., AI, machine learning, OCR, object recognition, item validation, produce recognition, analytics, etc.) may be performed on the monochrome images externally to the data reading system 100 by external devices coupled through the multi-port network switch 140. Such monochrome images or other data stream may be routed directly to the network connected external devices to the multi-port network switch 140 after first being received by the main board 130.

Image data (e.g., streaming video, image frames, etc.) from the TDR 152 or other external peripheral cameras 154, 156 may be routed through the multi-port network switch 140 to the processing/analysis modules located internal to the data reading system 100 such as the one or more processors 135 supported by the main board 130. As such, image analysis (e.g., AI, machine learning, OCR, object recognition, item validation, produce recognition, analytics, etc.) may be performed on the images (e.g., color and/or monochrome) internally within the data reading system 100 by the one or more processors 135 supported by the main board 130. In some embodiments, barcode decoding may also be performed on such images internally within the data reading system 100 by the one or more processors 135 supported by the main board 130. Image data from the TDR 152 or other external peripheral cameras 154, 156 may also be routed through the multi-port network switch 140 to external devices, such as the display 158, the remote server 160, point-of-sale system 162, or other similar devices including any network enabled POS systems. As such, image analysis (e.g., AI, machine learning, OCR, object recognition, item validation, produce recognition, analytics, etc.) may be performed on these images externally to the data reading system 100 by external devices coupled through the multi-port network switch 140. Such images or other data stream may be routed directly to the network connected external devices through the multi-port network switch 140 without first being received by the main board 130 (if at all).

In other embodiments, data relating to diagnostic information and performance characteristics of the data reading systems 10, 100, such as images, video, text, website links, and other suitable data may be routed from the one or more processors 135 through the multi-port network switch 140 to the external devices, such as the display 158 and the remote server 160 for review and use by a user. In other embodiments, the data may be obtained by the one or more processors 135 and/or the multi-port network switch 140 through a removable storage device 166 The data may be used to troubleshoot performance anomalies impacting the data reading systems 10, 100 as further described below with reference to FIG. 3. The data relating to the diagnostic information may be pre-stored in memory (e.g., internal memory, removable memory, and/or cloud storage) and retrieved in response to the scanner performance anomaly being detected.

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (PoE)) to the main board 130 and the data readers 116, 126. Data readers 112, 114, 122, 124 and illumination assemblies 118, 128 may be powered via the main board 130.

Features of employing the multi-port network switch 140 as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

FIG. 3 is a flow chart illustrating a method 300 for communicating to a user diagnostic information relating to a performance characteristic of a data reading system (e.g., data reading systems 10, 100) to aid a user in resolving performance anomalies in accordance with one embodiment. As described in further detail below with particular reference to FIG. 3, the method 300 is designed to provide easily digestible information to a user that clearly communicates anomalies that may require troubleshooting to ensure the data reading system 10, 100 is functioning properly. As noted previously, the method 300 eliminates the need to decipher alphanumeric codes, symbols, and/or other data that may be presented in a status display 58 (such as a seven-segment display or other similarly limited display) for determining one or more performance anomalies, and instead relies on the communication of photos, text, videos, audio messages, and/or other suitable data to a user to readily identify a performance anomaly and to provide an expedient solution for resolving the performance anomaly. As noted previously, photos, text, videos, and the like may be communicated to the user via existing audiovisual technology incorporated in the data reading system.

For convenience and to avoid repetition, the following discussion proceeds primarily with reference to the data reading systems 10, 100 of FIGS. 1-2, but it should be understood that the method 300 described with reference to FIG. 3 may apply equally to other data reading system configurations that may include additional or fewer components than the data reading systems 10, 100. In some embodiments, the method 300 may also be incorporated for use with portable, handheld data reading systems.

As described previously with reference to FIG. 1, in an ordinary operation, the data reading system 10, 100 obtains information for an item 20 (e.g., a barcode or other optical code data) as it is processed by the customer during a checkout transaction. In some checkout processes, the customer 38 may present the barcode on the items 20 to the scan windows 46, 48 for reading by the data readers 50, 52, or the customer 38 may input an item description into the data reading system 10, 100 via the display 54 to identify and process the item 20, or the customer 38 may take other suitable action to ensure the information for each item 20 in the transaction is received and processed by the data reading system 10, 100. On some occasions, however, the data reading system 10, 100 may not operate properly due to a malfunction, a component breakdown, or any one of a variety of potential performance anomalies. Accordingly, the data reading system 10, 100 may not be able to process further items 20 until the anomalies are resolved. With particular reference to FIG. 3, the following provides additional details for an improved method 300 for communicating these performance anomalies to a user and for providing guidance to aid the user in resolving the anomalies.

At step 302, the processor 135 and/or other suitable component(s) of the data reading system 10, 100 that may be in communication with the processor 135, identifies that a performance anomaly has occurred that is impacting proper performance and the functionality of the data reading system 10, 100. As noted previously, the processor 135 (and/or main board 130) may include suitable executable instructions and programming modules to receive feedback from the various components of the data reading system 10, 100 for monitoring diagnostic and performance anomalies for the data reading system 10, 100. The scanner performance anomalies experienced by the data reading system 10, 100 may incorporate a broad range of anomalies, such as command errors, runtime errors, system errors, hardware operation errors, etc. Examples of different command errors may include configuration errors, such as commands that define a region of interest for image capture not falling within a specified range. Examples of runtime errors may include an inability for the data readers 50, 52 (see FIG. 1) to capture images of the item 20; improper illumination characteristics (e.g., timing, brightness, etc.) of the illumination assemblies 118, 128; a loss of communication between scanner components (e.g., between the imager and the main processor, between a TDR and the main processor or multi-port network switch, between peripheral cameras and the multi-port network switch or the main processor, between the main processor and co-processing modules such as an AI accelerator, etc.); a loss of communication with the point-of-sale system 162 to continue the transaction; and/or a loss of communication with the remote server 160 to identify scanned items. Example of system related errors may include an unexpected system reset, a hardware component failure, etc. Examples of hardware operation errors may include faulty operation of the processor 135, multi-port networks switch 140, top-down reader 152, cameras 154, 156, storage device 166, or other hardware components of the data reading system 10, 100. It should be understood that the foregoing anomalies are meant to provide examples only for illustration purposes and are not meant to provide an exhaustive list. In other embodiments, the data reading system 10, 100 may experience other performance anomalies not explicitly described herein that require resolution.

At step 304, the processor 135 and/or other suitable component(s) of the data reading system 10, 100 that may be in communication with the processor 135, generates a performance signal indicating that a performance anomaly has been identified. The performance signal generated by the processor 135 may be based, at least in part, on performance data (e.g., component temperature, system clock speed, memory usage, etc.) being irregular and/or some other irregularity in the operation of the data reading system 10, 100, such as an unexpected system reset, a communication failure between components, a software error, etc.

In some embodiments, the detected anomaly may be predictive in nature such that an issue is identified before a larger problem is encountered by the data reading system 10, 100. The one or more processors 135 (either alone or in combination with other systems) may, therefore, analyze real-time performance data trends of any component of the data reading system 10, 100 to identify anomalies indicative of a predicted error that may occur in the future. For example, the processor 135 may assess the potential for future operational errors associated with any of the components of the data reading system 10, 100 including the multi-port networks switch 140, top-down reader 152, cameras 154, 156, storage device 166, or other hardware components of the data reading system 10, 100. As a result, the performance signal generated by the processor 135 may also be indicative of a predicted error associated with any component of the data reading system 10, 100. Certain predicted errors may be desirable to address soon, while others may be acceptable for the user to address later. The format and/or timing of generating the performance signal may depend on the type of predicted error (e.g., component failure), as well as the predicted timeline for such error to occur (e.g., 1 week, 1 month, etc.).

At step 306, the performance signal is communicated to a user (e.g., a technician, store personnel) via an audiovisual channel (e.g., via video communication channel to an electronic display 158, via an audio communication channel to a speaker 62) to alert the user that a performance anomaly has been identified and the data reading system 10, 100 may not be operating properly. In some embodiments, the performance signal may be communicated in an image format (e.g., a still image, video data, etc.) that may be received by a computer, POS system, mobile phone, tablet, or other suitable electronic device in communication with the user. In some embodiments, the performance signal may be communicated via an audiovisual channel as an error message displayed in alphanumeric characters, words, phrases, or other suitable text on the display 54 (see FIG. 1) or other suitable display in communication with the data reading system 10, 100. Such textual information may be overlayed on other image data that may be displayed be the electronic display in communication with the data reading system 10, 100. In still other embodiments, the performance signal may be communicated in an audio format generating an audio signal (such as a beep or other message) communicated through a speaker 62 (see FIG. 1) of the data reading system 10, 100, or may be communicated in text formal, such as a text message sent to a computer, POS system, mobile phone, tablet, or other suitable electronic device in communication with the user. In still other embodiments, any other suitable forms may be employed to communicate from the data reading system 10, 100 to the user that a performance anomaly has occurred and requires resolution.

In some embodiments, the performance signal may also be communicated to a user as alphanumeric characters or symbols in a non-video or audio format, such as via the status display 58 (e.g., a seven-segment display). For clarity, in some embodiments, the data reading system 10, 100 may not include a status display 58 and may instead communicate the performance signal using other suitable methods, including any of those described above. As noted above, the performance signal serves simply to indicate to the user at a first glance that an anomaly impacting performance of the data reading system 10, 100 has been identified and requires attention. Additional depth of information regarding the performance anomaly and guidance for resolving the issue may be communicated through more information-rich methods via the data reading system 10, 100 as a secondary measure if desired by the user.

In some embodiments, the performance signal communicated at step 306 may vary depending on the source of the performance anomaly identified. The performance signal may also be indicative of the specific type of anomaly that occurred. As a result, information indicative of the specific type of anomaly and/or an affected component may be conveyed to the user via the performance signal. For example, in some embodiments, the performance signal may include different information in one of an image-based format and/or a text-based format for displaying on an electronic display to inform the user of the performance anomaly. In some embodiments, the performance signal be in a non-image or non-text based format that may cause the status display 58 to communicate a unique alphanumeric code associated with the individual components and/or other specific performance anomaly of the data reading system 10, 100. The alphanumeric code may relate to the specific component that may be malfunctioning and/or a specific performance anomaly. In other embodiments, the specific audio tone (e.g., a beep) or specific message may change depending on which component may be malfunctioning and/or other specific performance anomaly. To generate the appropriate performance signal based on the specific performance anomaly that has been identified, the processor 135 may query a suitable system (such as a locally-stored database or memory 132, a database in communication with the remote server 160, executable instructions within its own programming, or from another suitable system) to retrieve information corresponding to the specific identified performance anomaly as determined by the processor 135.

At step 308, the data reading system 10, 100 may receive instructions from the user to enter into a mode for troubleshooting to initiate an error display functionality of the data reading system 10, 100 for resolving the performance anomaly. In some embodiments, the user may initiate troubleshooting mode in response to receiving the performance signal communicated by the data reading system 10, 100 at step 306. In other embodiments, the user may opt to enter troubleshooting mode without having received the performance signal, such as for routine maintenance or other purposes (e.g., on-demand review of prior recorded anomalies).

With reference to step 308, the mechanism for instructing the data reading system 10, 100 to enter into troubleshooting mode may take any one of several suitable forms. For example, in one embodiment, the user may present a triggering optical code to the data readers 50, 52 via any one of the scan windows 46, 48, where the optical code contains specific instructions executable by the processor 135 (or other suitable modules) to activate the troubleshooting mode of the data reading system 10, 100 upon decoding of the optical code and initiate the error display functionality to obtain more information about the performance anomaly. The triggering optical code may be in physical print format (such as via a card, label, or other similar format) or may be in electronic format (such as a QR code) generated on a mobile phone, tablet, or other suitable electronic device.

In other embodiments, the data reading system 10, 100 may instead receive instructions for entering the troubleshooting mode from the user via other suitable methods. For example, in one embodiment, the data reading system 10, 100 may include a manually-actuatable button 60 (see FIG. 1) in communication with the processor 135, where the button 60 is depressible for triggering the troubleshooting mode of the data reading system 10, 100. In other embodiments, the processor 135 may be in communication with the display 54 (see FIG. 1), or with the display of the point-of-sale system 162 (see FIG. 2), or with another suitable display, where the display 54, 162 presents a user-selectable prompt to engage the troubleshooting mode and/or confirm instructions to enter into troubleshooting mode. In such embodiments, the user may select the prompt via touch screen operation, a stylus, or other suitable input device (e.g., a keyboard). In still other embodiments, the user may communicate with the data reading system 10, 100 through a remote electronic device (e.g., a phone, tablet, computer system, etc.) separate from, but in operative communication (either via a wireless or wired network) with the data reading system 10, 100 to engage the troubleshooting mode. For example, in some embodiments, the user may activate troubleshooting mode on the data reading system 10, 100 through the remote electronic device. In some embodiments, the user may communicate with the data reading system 10, 100 through an audio input device (e.g., microphone) through which the user may speak instructions that are understood by the data reading system 100 as verbal instructions to initiate troubleshooting mode.

At step 310, the processor 135 (or other suitable module of the data reading system 10, 100) retrieves diagnostic information identifying specific details of the performance anomaly. In some embodiments, the processor 135 may query internal system memory 132, such as a look-up table or other stored diagnostic information, to retrieve the diagnostic information. In other embodiments, the processor 135 may query the remote server 162 or other remote database for the diagnostic information. In still other embodiments, the processor 135 may query a removable storage device 166 in communication with the data reading system 10, 100, such as via the multi-port network switch 140, to retrieve the diagnostic information. The retrieved diagnostic information may include text, photos, videos, or other suitable data identifying the performance anomaly. In some embodiments, the data reading system 10, 100 may internally store files with smaller memory requirements (i.e., files of relatively small size), such as text and compressed audio and video. In such embodiments, larger files, such as audio, video, files with rich graphics, etc. may be stored remotely in a database with higher storage capacity, such as the removable storage device 166, the remote server 162, or other suitable database. In such embodiments, the processor 135 may query both the internal memory 132 (or other suitable internal database) and the remote server 162 (or other suitable external database) to gather the necessary diagnostic information.

In some embodiments, the selection for which files to retrieve as the diagnostic information may be based on the determination for the type and/or source of the performance anomaly. As described above, this determination may be influenced by additional circumstantial performance data recorded at the time of detecting the performance anomaly. For example, the processor 135 may record performance data (e.g., a time stamp, component temperature, system clock speed, memory usage, CPU load, etc.) at the time when the performance anomaly was detected. This circumstantial performance data by itself may not be enough to be considered an anomaly that triggers the generation of a performance signal, but may be used by the diagnostic module to more completely diagnose the performance anomaly and to determine the source of the anomaly, the affected components, and/or the type of anomaly in question.

At step 312, the processor 135 (or other suitable module of the data reading system 10, 100) retrieves guidance information for aiding the user in resolving the performance anomaly based on the identity of the performance anomaly. The guidance information may include audio, video, and/or text that provides instructions to the user for resolving the performance anomaly. In a similar fashion as described above with reference to step 310, the processor 135 may retrieve the guidance information by querying internal system memory 132 (or other internal database), by communicating with an external database, such as the remote server 162 or the removable storage device 166, or by both consulting internal and external sources. In some embodiments, the source of the guidance information (whether internal or external) may depend on the file size of the guidance information to minimize demands on the data reading system 10, 100. For example, larger video files may be stored external to the data reading system 10, 100, while smaller images, text files and/or videos, may be stored in internal memory. The circumstantial performance data (e.g., a time stamp, component temperature, system clock speed, memory usage, etc.) may also be used by the troubleshooting module to determine a proposed course of action.

At step 314, the processor 135 (or other suitable module of the data reading system 10, 100) outputs the diagnostic information identifying the performance anomalies from step 310 and providing the user with the guidance information and related resource materials from step 312 for resolving the performance anomaly. The processor 135 may output the diagnostic information and the guidance information in any suitable format or combination of formats. As noted above, the information may take anyone of various suitable forms, including a text format, an image format (including video), and/or an audio format. In some embodiments, the diagnostic information may be provided in a different format than the guidance information. For example, the diagnostic information may be provided in an audio format, while the guidance information may be provided in an image or video format. In some embodiments, diagnostic information and/or guidance information may be provided in multiple formats. For example, some guidance information may be provided in a text format, while other guidance information may be provided in an image format. The diagnostic information and/or guidance information may also include, for example, an internet website (e.g., hyperlink) that directs the user to more targeted information, such as an instructional video (e.g., on a video streaming platform), a section in an on-line user manual, or other suitable information.

As one example, the processor 135 may identify that a performance anomaly occurred with the image capture devices. The display 54 may provide a textual description of the performance anomaly (e.g., "imaging devices not capturing images") as diagnostic information, and may include one or more of videos, photos, and text as guidance information for resolving the issue (e.g., instructions explaining how to ensure scan windows are clear, how to ensure imaging device is powered on, how to ensure imaging device optics are operating, etc.). In some embodiments, the guidance information communicated to the user may also provide an accessible link to a customer support website (or other suitable web address, such as opening to a specific section of a digital user manual) for the data reading system 10, 100, or for the specific component experiencing the performance anomaly (e.g., a link to the imaging device manufacturer may be provided), to allow the user to access guidance information directly from the manufacturer. In still other embodiments, the display 54 may generate a QR code that the user can access via a suitable electronic device to connect the user to any suitable database (e.g., remote server 160, storage device 166, an external website, or other suitable source) for obtaining the necessary information for troubleshooting the identified performance anomaly.

In some embodiments, the display 54 or other electronic device presenting the guidance information (and the QR code) to the user is external to and operating separately from the data reading system 10, 100. In some embodiments, the data reading system 10, 100 may not have suitable performance characteristics (e.g., processing power, graphics capabilities, memory, etc.) for storing all the guidance information and/or for displaying the guidance information, especially if the data includes large video files or other rich data (e.g., streaming videos, graphic-rich images, etc.). Accordingly, to help minimize operational demands on the data reading system 10, 100, the guidance information may be presented via components that are separate from the data reading system 10, 100.

As another example, the processor 135 may identify that a performance anomaly occurred with the data reading system 10, 100 experiencing an unexpected reset. The display 54 may provide a textual description of the performance anomaly (e.g., "unexpected scanner reset occurred") as diagnostic information, and may include one or more of videos, photos, and text as guidance information for resolving the issue (e.g., instructions explaining how to test various solutions, etc.). As discussed above, circumstantial performance data may be recorded at the time of the anomaly condition, such as the temperature of certain components, memory usage, CPU clock speed, etc. This circumstantial performance data may further refine the diagnosis and guidance provided to the user by retrieving more specific diagnostic information and/or guidance information available.

In some embodiments, the circumstantial performance data may also be communicated with the diagnostic information and/or the guidance information to be visible to the user such as being displayed. In some embodiments, the performance data may also be stored in memory for subsequent retrieval (e.g., via a service technician, for providing to technical support agent, etc.) if additional assistance is needed to resolve the problem. Doing so may speed up the process for technical support requests, more accurately communicate the issue to the technicians or agents providing the support, and/or assist these individuals in their own troubleshooting efforts by providing them with specific targeted information and guidance related to the detected anomaly.

At step 316, the processor 135 may receive input from the user for resolving the performance anomaly. For example, the user may input commands via the display 54 (or other suitable input device) to reboot the data reading system 10, 100, or may input executable instructions to adjust features for components that are not operating properly. For example, in some embodiments where the imaging devices may not be properly capturing data, the user may input commands to adjust the illumination pattern or intensity of the illuminating assemblies 118, 128 to help resolve the performance anomaly. In cases where one or more components may require replacement, the user may input a command after the components have been replaced to ensure the data reading system 10, 100 is functioning as desired with the new component in place. At step 318, the processor 135 implements the user instructions to resolve the performance anomaly. In some embodiments, at step 320, the processor 135 may convey a message (either via text, audio, or other suitable format) notifying the user that the performance anomaly has been resolved.

In some embodiments, the user may connect a suitable electronic device, (not shown) via a port (e.g., an Ethernet port or other suitable communication port) in communication with the multi-port network switch 140. The connected electronic device may then be used to communicate with the data reading system 10, 100 and implement the method 300. For example, in such embodiments, the device may be used to trigger the troubleshooting mode at step 308, to receive the information identifying the performance anomaly and the guidance information for resolving the performance anomaly at steps 310, 312, and used to provide input to the processor 135 to resolve the performance anomaly at step 316. As noted previously, this configuration may help minimize operational demands on the data reading system 10, 100.

As illustrated in FIG. 3, the method 300 provides a streamlined approach both for communicating performance anomalies relating to the data reading system 10, 100 and for providing directly accessible information to a user for expedient resolution of the performance anomalies. As described, rather than simply providing an error code or other encoded data through a status display 58 that may require manual consultation or review of a look up table or secondary source to decipher, the method 300 provides actionable information that clearly communicates an identified performance anomaly to the user in standard language and/or a more clearly stated visual representation (as opposed to encoded data) and also provides guidance information in video, audio, text, and/or other suitable formats for resolving the identified performance anomaly. Moreover, as noted previously, the method 300 may be implemented using existing audio and video technologies that are otherwise used by the data reading systems 10, 100 during normal operation. For example, the display 54 may normally present data relating to a transaction (e.g., including a running transaction list, description, price, weight, etc.), and can also be used to present information relating to addressing a performance anomaly.

It should be understood that in other embodiments, certain steps described in process 300 of FIG. 3 may be combined, rearranged, altered, varied, and/or omitted without departing from the principles of the disclosed subject matter. For example, in some embodiments, step 308 may be omitted and the data reading system 10, 100 may simply automatically enter into troubleshooting mode and await further instruction from the user as soon as a performance anomaly is identified. In other embodiments, steps 310 and 312 may be combined. For example, the information identifying the performance anomaly may be stored together in an internal database or an external database (or a combination of the two databases) with the information for resolving the identified anomaly. In such embodiments, the processor 135 obtains both pieces of information essentially simultaneously for presentation to the user. Moreover, in some embodiments, steps 316, 318 may be omitted, such as when the performance anomaly simply requires repair or replacement of a component of the data reading system 10, 100. In such scenarios, the component may be replaced and the processor 135 may receive no further instruction from the user since repair or replacement of the component (along with rebooting the system) may resolve the performance anomaly.

In some embodiments, the diagnostic module and/or the trouble shooting module may be powered by a generative AI engine that receives various inputs (e.g., error code, stored diagnostic data, stored guidance data, circumstantial performance data, etc.) that are applied to one or more trained AI module(s) that outputs a description of the detected anomaly as well as guidance to resolve it. In some embodiments, the generative AI engine(s) may be executed internally by the scanner (e.g., on-board processors 135 such a microprocessor and/or an AI accelerator). In some embodiments, the generative AI engine(s) may be executed remotely via a remote AI service, with the results returned to the scanner, POS system, mobile device, or otherwise provided to a user for action to be taken.

In some embodiments, the AI generated output may be produced using natural language descriptions in text that describe the detected anomaly and/or how to resolve the issue. In some embodiments, the AI generated output may include AI generated images (e.g., including video) that illustrate the anomaly or otherwise visually communicate to the user information about the detected anomaly and/or how to resolve the issue. In some embodiments, the AI output may include AI generated audio describing the anomaly and/or how to resolve the issue. The AI generated output may be transmitted over the audiovisual channels and provided to the user as described above.

The user interface may also provide the user with the ability to ask additional questions of the generative AI engine and/or enter prompts that may further explain the problem, ask additional questions, make specific requests, etc. that are then received by the generative AI engine(s) that then may further refine or revise the diagnosis/guidance and/or generate new content in response thereto.

It is intended that subject matter disclosed in portion herein can be combined with the subject matter of one or more of other portions herein as long as such combinations are not mutually exclusive or inoperable. In addition, many variations, enhancements and modifications of the systems and methods described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading system comprising:
   a housing supporting a scan window;
   one or more data readers disposed within the housing, each data reader having a field-of-view directed through the scan window, wherein each data reader is operable to capture an item image of an item as the item passes across the scan window;
   an external display disposed outside of the housing; and
   a processor operable to receive the item image from at least one of the one or more data readers for the item and determine the item from image analysis of the item image by the processor, the processor in operable communication with the external display, wherein the processor is further configured to:
   detect an occurrence of a performance anomaly associated with a-monitoring one or more performance characteristics impacting an operational parameter of the data reading system;
   obtain circumstantial performance data associated with operational performance of one or more components of the data reading system, the circumstantial performance data recorded at a time corresponding to the occurrence of the performance anomaly, wherein the circumstantial performance data includes one or more of a system clock speed, a component temperature, a memory usage, or a CPU load recorded at the time of detecting the performance anomaly;
   retrieve diagnostic information indicative of the performance anomaly;
   retrieve guidance information for resolving the performance anomaly, wherein a generative AI engine is configured to produce an AI generated output of audio, video, and/or text as the guidance information containing instructional content for how a user is to resolve the performance anomaly based on the generative AI engine receiving the diagnostic information and the circumstantial performance data as inputs;
   communicate the diagnostic information and the guidance information in one or more of a video format, an audio format, an image format, or a text format over an output channel of the data reading system to the external display, wherein one or both of the diagnostic information and the guidance information are presented on the external display;
   receive input for resolving the performance anomaly; and
   execute instructions for resolving the performance anomaly by modifying the data reading system in response to receiving the input.

2. The data reading system of claim 1, wherein the processor is further configured to:
   analyze real-time information data associated with an operational performance of one or more components of the data reading system; and
   predict an occurrence of a future error associated with the operational performance of the one or more components, wherein the performance anomaly further includes the prediction of the future error associated with the operational performance of the one or more components.

3. The data reading system of claim 1, wherein the processor is further configured to configure a troubleshooting mode for resolving the performance anomaly in response to at least one of decoding a trigger code presented to the scan window or manual actuation of a trigger in operable communication with the processor.

4. The data reading system of claim 1, further comprising a removable storage device in communication with the processor, wherein the removable storage device includes the guidance information stored therein, and wherein the processor is configured to retrieve the guidance information from the removable storage device.

5. The data reading system of claim 1, wherein the processor is further configured to:

generate a performance signal in response to identifying the performance anomaly; and communicate the performance signal indicating that the performance anomaly has been identified.

6. The data reading system of claim 5, the data reading system further comprising a status display disposed within the housing and beneath the scan window, the status display in operable communication with the processor, wherein the processor communicates the performance signal as an alphanumeric code on the status display.

7. The data reading system of claim 1, wherein the processor is configured to query an internal database to retrieve guidance information in a text format and to query an external database to retrieve guidance information in a video format.

8. The data reading system of claim 1, wherein the processor is further configured to execute a user interface that receives inputs from the user that are provided to the generative AI engine to further revise the diagnostic information and/or the guidance information in response thereto.

9. The data reading system of claim 1, wherein the user interface generates prompts for the user to enter an explanation of a problem, ask questions, or make specific requests as the inputs provided to the generative AI engine.

10. The data reading system of claim 1, wherein the generative AI engine is executed internally by the processor.

11. The data reading system of claim 1, wherein the generative AI engine is executed remotely by a remote service in communication with the data reading system.

12. A method of communicating and resolving a performance anomaly in a data reading system, the method comprising:

detecting, via image analysis by a processor, an occurrence of the performance anomaly associated with monitoring one or more performance characteristics impacting operation of the data reading system;

obtaining circumstantial performance data associated with operational performance of one or more components of the data reading system, the circumstantial performance data recorded at a time corresponding to the occurrence of the performance anomaly, wherein the circumstantial performance data includes one or more of a system clock speed, a component temperature, a memory usage, or a CPU load recorded at the time of detecting the performance anomaly;

communicating, via the processor, a performance signal to a user indicating that the occurrence of the performance anomaly has been identified;

retrieving, via the processor, diagnostic information for identifying the performance anomaly;

retrieving, via the processor, guidance information for resolving the performance anomaly based on the diagnostic information, wherein a generative AI engine is configured to produce an AI generated output of audio, video, and/or text as the guidance information containing instructional content for how the user is to resolve the performance anomaly based on the generative AI engine receiving the diagnostic information and the circumstantial performance data as inputs;

communicating, via the processor, the diagnostic information and the guidance information to an external display;

presenting, via the external display, the diagnostic information and the guidance information based on the performance anomaly;

receiving, via the processor, input from the user for resolving the performance anomaly; and executing instructions for resolving, via the processor, the performance anomaly by modifying the data reading system based on the received input.

13. The method of claim 12, further comprising configuring, via the processor, a troubleshooting mode of the data reading system after communicating the performance signal to the user, wherein the troubleshooting mode enables the user to provide the input for resolving the performance anomaly.

14. The method of claim 12, further comprising:

configuring, via the processor, a troubleshooting mode in response to one of detecting actuation of a trigger button or decoding of a trigger code, wherein the troubleshooting mode enables the user to provide the input for resolving the performance anomaly.

15. The method of claim 12, wherein the guidance information includes instructions in a video format for resolving the performance anomaly, and wherein presenting, via the external display, the guidance information includes presenting, via the external display, the instructions in the video format.

16. The method of claim 12, wherein a database for guidance information is an external database in communication with the processor.

17. The method of claim 12, further comprising detecting, via the processor, an external device in communication with the processor, wherein the external device includes a database with guidance information stored therein, and further comprising querying, via the processor, the database for guidance information including communicating with the external device.

18. The method of claim 17, wherein the database further includes the diagnostic information, and wherein retrieving the diagnostic information further includes querying, via the processor, the database to obtain the diagnostic information.

19. The method of claim 12, wherein communicating, via the processor, the performance signal includes generating an audio message and communicating the audio message to the user.

20. The method of claim 12, wherein the step of communicating, via the processor, the performance signal to the user further comprises:

querying, via the processor, a diagnostic code associated with the performance anomaly; and presenting, via a status display different from the external display, the diagnostic code in an alphanumeric format.

* * * * *